United States Patent
Munteanu et al.

(10) Patent No.: US 7,282,277 B2
(45) Date of Patent: Oct. 16, 2007

(54) MAGNETIC RECORDING MEDIA WITH CU-CONTAINING MAGNETIC LAYERS

(75) Inventors: Mariana Rodica Munteanu, Santa Clara, CA (US); Erol Girt, Berkeley, CA (US); Samuel Dacke Harkness, IV, Berkeley, CA (US); Li-Lien Lee, San Jose, CA (US); Zhong (Stella) Wu, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 529 days.

(21) Appl. No.: 10/827,421

(22) Filed: Apr. 20, 2004

(65) Prior Publication Data

US 2005/0233174 A1 Oct. 20, 2005

(51) Int. Cl.
G11B 5/66 (2006.01)
G11B 5/70 (2006.01)

(52) U.S. Cl. .................................. 428/829

(58) Field of Classification Search ............... 428/827, 428/828, 828.1, 829, 836.1, 826
See application file for complete search history.

(56) References Cited

U.S. PATENT DOCUMENTS 6,682,834 B2 * 1/2004 Okuyama et al. ......... 428/832.2
6,964,819 B1 * 11/2005 Girt et al. .................. 428/828
7,074,508 B2 * 7/2006 Ajan ........................... 428/829
2002/0037441 A1 3/2002 Okuyama et al.
2003/0017370 A1 * 1/2003 Shimizu et al. ...... 428/694 TM

FOREIGN PATENT DOCUMENTS

JP 08031638 * 2/1996

OTHER PUBLICATIONS

English abstract of JP 08-031638, Feb. 1996, Kubota Corp.*
Pending U.S. Appl. No. 11/361,004, filed Feb. 24, 2006 entitled "Magnetic Storage Media With Ag, Au-Containing Magnetic Layers".

* cited by examiner

Primary Examiner—Holly Rickman
(74) Attorney, Agent, or Firm—McDermott Will & Emery LLP (57) ABSTRACT

A magnetic recording medium including at least one Cu-containing magnetic recording layer (CuML) comprised of a Cu-containing magnetic alloy material selected from the group consisting of:

(a) a CoCrPtBCu alloy having a composition represented by the formula $Co_{100-x-y-z-\alpha}Cr_xPt_yB_zCu_\alpha$, wherein $0<x\leq20$, $0<y\leq30$, $0<z\leq24$, and $0<\alpha\leq10$;

(b) a CoCrPtBCu alloy having a composition represented by the formula $Co_{100-x-y-z-\alpha}Cr_xPt_yB_zCu_\alpha$, wherein $0<x\leq30$, $0<y\leq30$, $7<z\leq24$, and $0<\alpha\leq10$; and (c) a CoCrTaCu alloy having a composition represented by the formula $Co_{100-x-y-\alpha}Cr_xTa_yCu_\alpha$, containing less than 30 at. % Cr, up to 8 at. % Ta, and up to 10 at. % Cu.

13 Claims, 8 Drawing Sheets

MAGNETIC RECORDING MEDIA WITH CU-CONTAINING MAGNETIC LAYERS

FIELD OF THE INVENTION

The present invention relates to improved, high recording performance magnetic recording media comprising at least one Cu-containing magnetic recording layer for improved segregation for obtaining sharper transitions between the magnetic grains and non-magnetic Cr-rich grain boundaries. More particularly, the invention relates to hard disk recording media with increased saturation magnetization ($M_s$) and magnetocrystalline anisotropy and narrower intrinsic switching field distribution.

BACKGROUND OF THE INVENTION

Magnetic recording ("MR") media and devices incorporating same are widely employed in various applications, particularly in the computer industry for data/information storage and retrieval applications, typically in disk form. Conventional thin-film type magnetic media, wherein a fine-grained polycrystalline magnetic alloy layer serves as the active recording layer, are generally classified as "longitudinal" or "perpendicular", depending upon the orientation of the magnetic domains of the grains of magnetic material.

Figure 1:
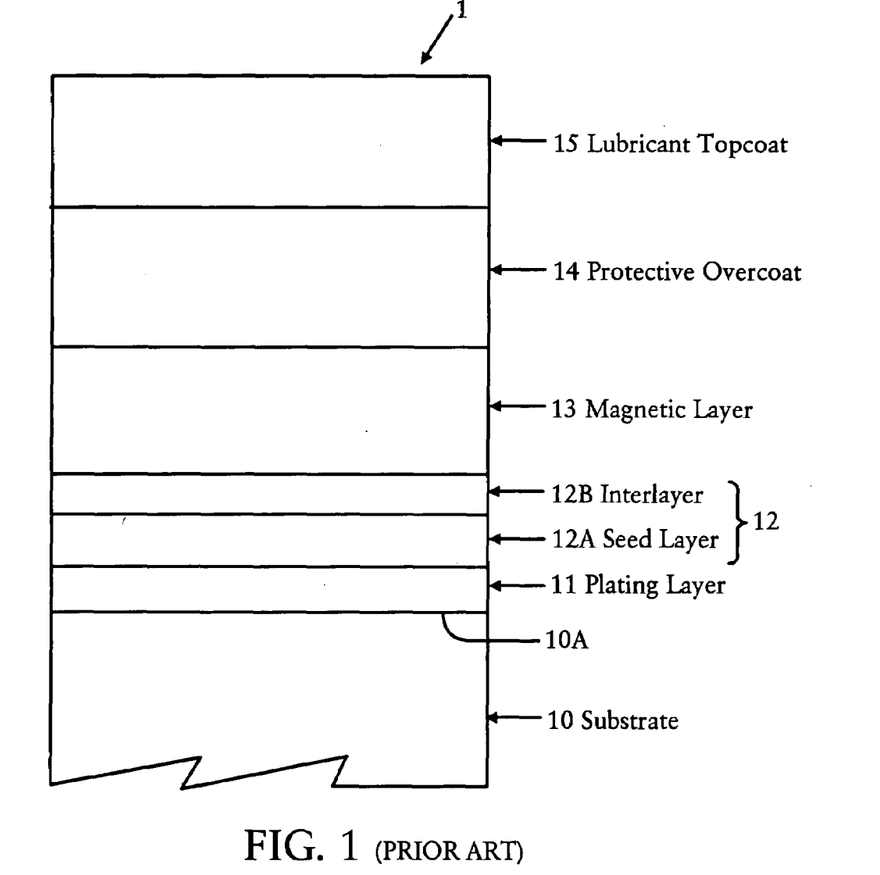
FIG. 1 schematically illustrates, in simplified cross-sectional view, a portion of a thin-film, longitudinal type magnetic recording medium.

A portion of a conventional longitudinal recording, thin-film, hard disk-type magnetic recording medium 1 commonly employed in computer-related applications is schematically illustrated in FIG. 1 in simplified cross-sectional view, and comprises a substantially rigid, non-magnetic metal substrate 10, typically of aluminum (Al) or an aluminum-based alloy, such as an aluminum-magnesium (Al—Mg) alloy, having sequentially deposited or otherwise formed on a surface 10A thereof a plating layer 11, such as of amorphous nickel-phosphorus (Ni—P); a seed layer 12A of an amorphous or fine-grained material, e.g., a nickel-aluminum (Ni—Al) or chromium-titanium (Cr—Ti) alloy; a polycrystalline underlayer 12B, typically of Cr or a Cr-based alloy; a magnetic recording layer 13, e.g., of a cobalt (Co)-based alloy with one or more of platinum (Pt), Cr, boron (B), etc.; a protective overcoat layer 14, typically containing carbon (C), e.g., diamond-like carbon ("DLC"); and a lubricant topcoat layer 15, e.g., of a perfluoropolyether. Each of layers 11-14 may be deposited by suitable physical vapor deposition ("PVD") techniques, such as sputtering, and layer 15 is typically deposited by dipping or spraying.

In operation of medium 1, the magnetic layer 13 is locally magnetized by a write transducer, or write "head", to record and thereby store data/information therein. The write transducer or head creates a highly concentrated magnetic field which alternates direction based on the bits of information to be stored. When the local magnetic field produced by the write transducer is greater than the coercivity of the material of the recording medium layer 13, the grains of the polycrystalline material at that location are magnetized. The grains retain their magnetization after the magnetic field applied thereto by the write transducer is removed. The direction of the magnetization matches the direction of the applied magnetic field. The magnetization of the recording medium layer 13 can subsequently produce an electrical response in a read transducer, or read "head", allowing the stored information to be read.

Efforts are continually being made with the aim of increasing the areal recording density, i.e., the bit density, or bits/unit area, and signal-to-medium noise ratio ("SMNR") of the magnetic media. However, severe difficulties are encountered when the bit density of longitudinal media is increased above about 20-50 Gb/in$^2$ in order to form ultra-high recording density media, such as thermal instability, when the necessary reduction in grain size exceeds the superparamagnetic limit. Such thermal instability can, inter alia, cause undesirable decay of the output signal of hard disk drives, and in extreme instances, result in total data loss and collapse of the magnetic bits.

One proposed solution to the problem of thermal instability arising from the very small grain sizes associated with ultra-high recording density magnetic recording media, including that presented by the superparamagnetic limit, is to increase the crystalline anisotropy, thus the squareness of the magnetic bits, in order to compensate for the smaller grain sizes. However, this approach is limited by the field provided by the writing head.

Another proposed solution to the problem of thermal instability of very fine-grained magnetic recording media is to provide stabilization via coupling of the ferromagnetic recording layer with another ferromagnetic layer or an anti-ferromagnetic layer. In this regard, it has been recently proposed (E. N. Abarra et al., IEEE Conference on Magnetics, Toronto, April 2000) to provide a stabilized magnetic recording medium comprised of at least a pair of ferromagnetic layers which are anti-ferromagnetically-coupled ("AFC") by means of an interposed thin, non-magnetic spacer layer. The coupling is presumed to increase the effective volume of each of the magnetic grains, thereby increasing their stability.

The strength of coupling can be described in terms of the total exchange energy. For a pair of ferromagnetic layers separated by a non-magnetic spacer layer, the total exchange energy generally results from RKKY-type interaction (i.e., oscillation from anti-ferromagnetic to ferromagnetic with increasing spacer film thickness), dipole-dipole interactions between grains of the ferromagnetic layers across the spacer layer (which favors anti-ferromagnetic alignment of adjacent grains across the spacer layer), and exchange interaction (which favors ferromagnetic alignment of the ferromagnetic layers). In AFC media the thickness of the spacer layer is chosen to maximize anti-ferromagnetic coupling between the ferromagnetic layers, i.e., to maximize the RKKY-type anti-ferromagnetic coupling and the dipole-dipole interactions. According to this approach, the total exchange energy between the ferromagnetic layer pairs is a key parameter in determining the increase in stability.

Figure 2:
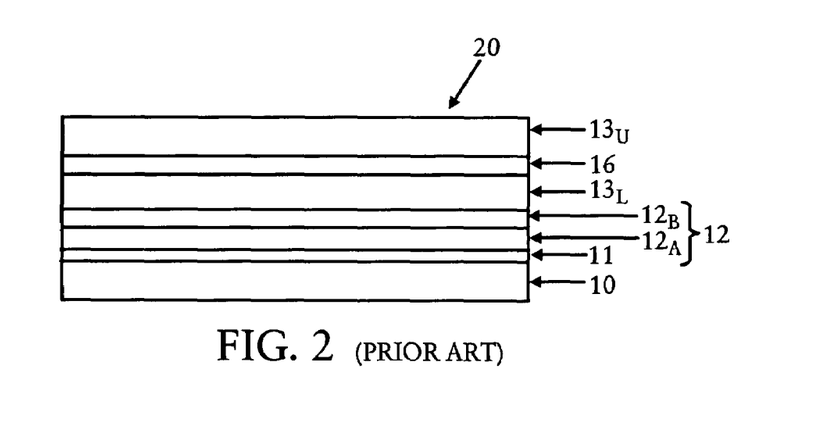
FIG. 2 schematically illustrates, in simplified cross-sectional view, a portion of an anti-ferromagnetically coupled (AFC) magnetic recording medium.

FIG. 2 schematically illustrates, in simplified cross-sectional view, a portion of an anti-ferromagnetically coupled (AFC) magnetic recording medium 20. As illustrated, medium 20 includes a non-magnetic substrate 10 selected from among non-magnetic metals and alloys, Al, Al-based alloys such as Al—Mg alloys, NiP-plated Al (NiP/Al), glass, ceramics, polymers, and composites of the aforementioned materials. The thickness of substrate 10 is not critical; however, in the case of magnetic recording media for use in hard disk applications, substrate 10 is of a thickness sufficient to provide the necessary rigidity. Substrate 10 typically comprises Al or an Al-based alloy, e.g., an Al—Mg alloy, and includes on the surface 10A thereof a plating layer 11, e.g., a layer of amorphous NiP. Formed on the plating layer 11 is an underlayer layer 12 for controlling the crystallographic texture and properties of ferromagnetic Co-based alloy layers deposited thereover, which underlayer 12 includes first, or lower, and second, or upper, portions 12A and 12B, respectively, as shown in FIG. 1, wherein the first, or lower portion 12A is a seed layer comprised of an amorphous or fine-grained material, e.g., a Ni—Al or Cr—Ti alloy layer from about 10 to about 1,000 Å thick, and the second, or upper portion 12B is a polycrystalline underlayer, typically a Cr or Cr-based alloy layer (e.g., of Cr—W, Cr—Mo, CoCr, etc.) from about 10 to about 300 Å thick.

In AFC medium 20, the single ferromagnetic layer 13 of the longitudinal magnetic recording medium 1 of FIG. 1 is replaced with a sandwich-type structure comprised of a pair of strongly anti-ferromagnetically coupled, crystalline ferromagnetic layers, i.e., a first, or lower, ferromagnetic layer $13_L$ (alternatively referred to as a "bottom layer") and a second, or upper, ferromagnetic layer $13_U$ (alternatively referred to as a "top layer"), which pair of ferromagnetic layers are spaced-apart by at least one thin, crystalline, non-magnetic anti-ferromagnetic coupling (AFC) layer 16. Typically, each of the first, or lower, and second, or upper, ferromagnetic layers $13_L$ and $13_U$, respectively, is comprised of an up to about 300 Å thick crystalline layer of at least one alloy of Co with at least one of Pt, Cr, B, Fe, Ta, Ni, Mo, V, Nb, Ru, Si, and Ge. The at least one thin, crystalline, non-magnetic spacer layer 16 is selected to provide a large RKKY-type coupling effect, and may comprise nearly any non-magnetic material, e.g., Ru, Ru-based alloys, Cr, and Cr-based alloys and is up to about 20 Å thick. Not shown in FIG. 2, for illustrative simplicity, is an optional magnetic layer, i.e., a top interface layer, interposed between the upper magnetic layer $13_U$ and the non-magnetic spacer layer 16 for improving RKKY coupling between the upper and lower magnetic layers $13_U$ and $13_L$.

High performance magnetic recording media generally require magnetic recording layers with well-defined, isolated magnetically isolated grains exhibiting little intergranular magnetic coupling, i.e., segregated grains. Such recording layers with segregated grains typically comprise traditional hcp.lattice-structured CoCr-based alloys, wherein Co-based magnetic grains are magnetically isolated by Cr-rich (i.e., Cr-segregated) non-magnetic grain boundaries. CoCr-based alloys suitable for use in forming magnetic recording layers with segregated grains typically comprise CoCrTa or CoCrPtX alloys, where X is at least one element selected from Ta, B, Mo, V, Nb, W, Zr, Re, Ru, Ag, Hf, Ir, and Y.

In either instance, the added Ta and/or B primarily serve to improve the segregation of the Cr atoms in the magnetic layer. However, the segregation profile of the Cr atoms in the magnetic layer upon addition Ta and/or B to CoCr-based alloys is not necessarily sharp enough for media required to satisfy the ever-increasing performance criteria and parameters required of high-performance magnetic disk recording media utilized in computer-related applications.

Accordingly, there exists a need for improved magnetic recording media with sharper transitions (i.e., segregation profiles) between Co-containing magnetic grains and Cr-rich, non-magnetic grain boundaries, which improved media exhibit increased saturation magnetization ($M_s$) and magnetocrystalline anisotropy and narrower intrinsic switching field distribution.

The present invention, therefore, addresses and solves the need for increased Cr grain segregation in CoCr-based magnetic recording layers, leading to obtainment of improved magnetic recording media with enhanced performance characteristics, while maintaining full compatibility with all aspects of conventional automated manufacturing technology for fabrication of magnetic media, e.g., hard disks. Moreover, manufacture of the improved magnetic media of the present invention can be implemented at a cost comparable to that of existing media.

DISCLOSURE OF THE INVENTION

An advantage of the present invention is improved magnetic recording media with magnetic layers having improved Cr segregation with sharper transitions between magnetic grains and Cr-rich, non-magnetic grain boundaries.

Another advantage of the present invention is improved magnetic recording media with increased saturation magnetization ($M_s$) and magnetocrystalline anisotropy and narrower intrinsic switching field distribution.

Yet another advantage of the present invention is improved magnetic recording media exhibiting enhanced magnetic recording performance characteristics.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to an aspect of the present invention, the foregoing and other advantages are obtained in part by a magnetic recording medium including at least one Cu-containing magnetic recording layer (CuML) comprised of a Cu-containing magnetic alloy material selected from the group consisting of:

(a) a CoCrPtBCu alloy having a composition represented by the formula $Co_{100-x-y-z-\alpha}Cr_xPt_yB_zCu_\alpha$, wherein $0<x\leq20$, $0<y\leq30$, $0<z\leq24$, and $0<\alpha\leq10$;

(b) a CoCrPtBCu alloy having a composition represented by the formula $Co1_{100-x-y-z-\alpha}Cr_xPt_yB_zCu_\alpha$, wherein $0<x\leq30$, $0<y\leq30$, $7<z\leq24$, and $0<\alpha\leq10$; and (c) a CoCrTaCu alloy having a composition represented by the formula $Co_{100-x-y-\alpha}Cr_xTa_yCu_\alpha$, containing less than 30 at. % Cr, up to 8 at. % Ta, and up to 10 at. % Cu.

In accordance with embodiments of the present invention, the Cu-containing magnetic alloy materials (a) and (b) further include at least one element selected from the group consisting of: Si, Ti, V, Fe, Ni, Ge, Zr, Nb, Mo, Ru, Ag, Hf, Ta, W, and Au. Similarly, according to embodiments of the invention, Cu-containing magnetic alloy material (c) further includes at least one element selected from the group consisting of: B, Si, Ti, V, Fe, Ni, Ge, Zr, Nb, Mo, Ru, Ag, Hf, Pt, W, and Au.

According to the invention, Cu-containing magnetic alloy materials (a) and (b) referred to throughout the instant specification and claims as "Cr-rich" contain more than 16 at. % Cr and as "Cr-poor" contain less than 16 at. % Cr. Similarly, according to the invention, Cu-containing magnetic alloy material (c) is referred to throughout the instant specification and claims as "Cr-rich" when the following condition obtains: $16\leq x<30$, $0<y\leq30$, $0<\alpha\leq10$, and as "Cr-poor" when the following condition obtains: $0<x\leq16$, $0<y\leq30$, and $0<\alpha\leq10$.

Embodiments of the present invention include media which comprise, in addition to the at least one Cu-containing magnetic recording layer comprised of a Cu-containing magnetic alloy material (a), (b), or (c), at least one Cu-containing magnetic recording layer (CuML) comprised of a Cu-containing magnetic alloy material having a composition represented by the formula $Co_{100-x-y-z-\alpha}Cr_xPt_yB_zCu_\alpha$, wherein $0<x\leq30$, $0<y\leq30$, $0<z\leq24$, $0<\alpha\leq10$, and $x+z\leq35$.

Further embodiments of the present invention include those wherein the medium further includes at least one Cu-free magnetic recording layer (ML). Preferred embodiments of the invention include those wherein the at least one Cu-free magnetic recording layer (ML) comprises a magnetic alloy material selected from among CoCr and CoCr containing at least one element selected from the group consisting of B, Si, Ti, V, Fe, Ni, Ge, Zr, Nb, Mo, Ru, Ag, Hf, W, Pt, and Au.

In accordance with preferred embodiments of the present invention, the media comprise stacked multi-layer structures. According to an embodiment of a stacked multi-layer medium according to the invention, the medium comprises a stacked bi-layer structure [ML/CuML]$_n$, where n=1 to 10 and each [ML/CuML] bi-layer is comprised of a Cu-free magnetic recording layer (ML) and an overlying Cu-containing magnetic recording layer (CuML) of a Cu-containing magnetic alloy material (a), (b), or (c).

Another embodiment of a stacked multi-layer medium according to the invention comprises a stacked tri-layer structure [ML/Cr-rich CuML/Cr-poor CuML]$_n$, where n=1 to 10 and each [ML/Cr-rich CuML/Cr-poor CuML] tri-layer is comprised, in overlying sequence, of a Cu-free magnetic recording layer (ML), a Cr-rich, Cu-containing magnetic recording layer (Cr-rich CuML) of a Cr-rich magnetic alloy material (a), (b), or (c), and an overlying Cr-poor, Cu-containing magnetic recording layer (Cr-poor CuML) of a Cr-poor magnetic alloy material (a), (b), or (c).

Still another embodiment of a stacked multi-layer medium according to the invention comprises a stacked tri-layer structure [ML]$_{i1}$[CuML]$_j$[ML]$_{i2}$, where $i_1$ and $i_2$ each=0-10, j=1-10, and $i_1+i_2+j\geq2$, comprised of 0-10 stacked Cu-free magnetic recording layers (ML) $i_1$ and $i_2$ and 1-10 stacked Cu-containing magnetic recording layers (CuML) each comprised of a Cu-containing magnetic alloy material (a), (b), or (c).

A further embodiment of a stacked multi-layer medium according to the invention comprises a stacked layer structure [ML]$_{i1}$[Cr-rich CuML]$_j$[Ml]$_{i2}$[Cr-poor CuML]$_k$[ML]$_{i3}$, where $i_1$, $i_2$, and $i_3$ each=0-10, j and k each=1-10, and $i_1+i_2+i_3+j+k\geq3$, comprised of 0-10 stacked Cu-free magnetic layers (ML) $i_1$, $i_2$, and $i_3$, 1-10 stacked Cr-rich, Cu-containing magnetic layers (Cr-rich CuML) each comprised of a Cu-containing magnetic alloy material (a), (b), or (c), and 1-10 stacked Cr-poor, Cu-containing magnetic layers (Cr-poor CuML) each comprised of a Cu-containing magnetic alloy material (a), (b), or (c).

A yet further embodiment of a stacked multi-layer medium according to the invention comprises a stacked bi-layer structure [Cr-rich CuML/Cr-poor CuML]$_n$, where n=1 to 10 and the [Cr-rich CuML/Cr-poor CuML] bi-layer is comprised of a Cr-rich, Cu-containing magnetic recording layer (Cr-rich CuML) of a Cr-rich magnetic alloy material (a), (b), or (c) and an overlying Cr-poor, Cu-containing magnetic recording layer (Cr-poor CuML) of a Cr-poor magnetic alloy material (a), (b), or (c).

Other embodiments of magnetic recording media according to the present invention are in the form of an anti-ferromagnetically coupled (AFC) media, comprising a bottom magnetic layer spaced apart from a top magnetic recording layer by a non-magnetic spacer layer, the top magnetic recording layer including a Cu-containing magnetic recording layer (CuML) comprised of Cu-containing magnetic alloy material (a), (b), or (c).

In accordance with embodiments of the invention, the spacer layer comprises a non-magnetic material selected from the group consisting of: Ru, Rb, Ir, Cr, Cu, Re, V, and their alloys; the top magnetic recording layer further includes at least one Cu-free magnetic recording layer; and the media further comprises a top interface layer between the top magnetic recording layer and the spacer layer for improving RKKY coupling of the top and bottom magnetic layers.

Media according to each embodiment of the present invention comprise a non-magnetic substrate and non-magnetic seed and underlayers, and may further comprise at least one non-magnetic interlayer.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention is based upon recognition that the improvement in segregation profile of Cr atoms in CoCr-based alloy magnetic layers upon addition Ta and/or B thereto is not necessarily sufficient to provide media required able to satisfy the ever-increasing performance criteria and parameters required of high-performance magnetic disk recording media utilized in computer-related applications. Accordingly, the present invention is based upon recognition of the need for further improvements in segregation behavior providing magnetic recording media with even sharper transitions (i.e., segregation profiles) between Co-containing magnetic grains and Cr-rich, non-magnetic grain boundaries than attainable by Ta and/or B additions to CoCr magnetic alloys, which improved media exhibit increased saturation magnetization ($M_s$) and magnetocrystalline anisotropy and narrower intrinsic switching field distribution.

Further, the present invention, addresses and solves the need for increased Cr grain segregation in CoCr-based magnetic recording layers, while maintaining full compatibility with all aspects of conventional automated manufacturing technology for fabrication of magnetic media, e.g., hard disks. Finally, manufacture of the improved magnetic media of the present invention can be implemented at a cost comparable to that of existing media.

Magnetic recording media, according to the present invention, include at least one Cu-containing magnetic recording layer (CuML) comprised of a Cu-containing magnetic alloy material selected from the group consisting of:

(a) a CoCrPtBCu alloy having a composition represented by the formula $Co_{100-x-y-z-\alpha}Cr_xPt_yB_zCu_\alpha$, wherein $0<x\leq 20$, $0<y\leq 30$, $0<z\leq 24$, and $0<\alpha\leq 10$;

(b) a CoCrPtBCu alloy having a composition represented by the formula $Co_{100-x-y-z-\alpha}Cr_xPt_yB_zCu_\alpha$, wherein $0<x\leq 30$, $0<y\leq 30$, $0<z\leq 24$, and $0<\alpha\leq 10$; and (c) a CoCrTaCu alloy having a composition represented by the formula $Co_{100-x-y-\alpha}Cr_xTa_yCu_\alpha$, containing less than 30 at. % Cr, up to 8 at. % Ta, and up to 10 at. % Cu.

Cu-containing magnetic alloy materials (a) and (b) may further include at least one element selected from the group consisting of: Si, Ti, V, Fe, Ni, Ge, Zr, Nb, Mo, Ru, Ag, Hf, Ta, W, and Au. Similarly, Cu-containing magnetic alloy material (c) may further include at least one element selected from the group consisting of: B, Si, Ti, V, Fe, Ni, Ge, Zr, Nb, Mo, Ru, Ag, Hf, Pt, W, and Au.

As defined herein, a layer of a Cu-containing magnetic alloy material (a) and (b) referred to in the instant specification and claims as "Cr-rich CuML" contains more than 16 at. % Cr. Similarly, as defined herein, a layer of a Cu-containing magnetic alloy material (a) and (b) referred to in the instant specification and claims as "Cr-poor CuML" contains less than 16 at. % Cr.

Further, as defined herein, a layer of a Cu-containing magnetic alloy material (c) referred to in the instant specification and claims as "Cr-rich CuML" satisfies the following conditions: $16\leq x\leq 30$, $0<y\leq 30$, and $0<\alpha\leq 10$. Similarly, as defined herein, a layer of a Cu-containing magnetic alloy material (c) referred to in the instant specification and claims as "Cr-poor CuML" satisfies the following conditions: $0<x\leq 16$, $0<y\leq 30$, and $0<\alpha\leq 10$.

Figure 3:
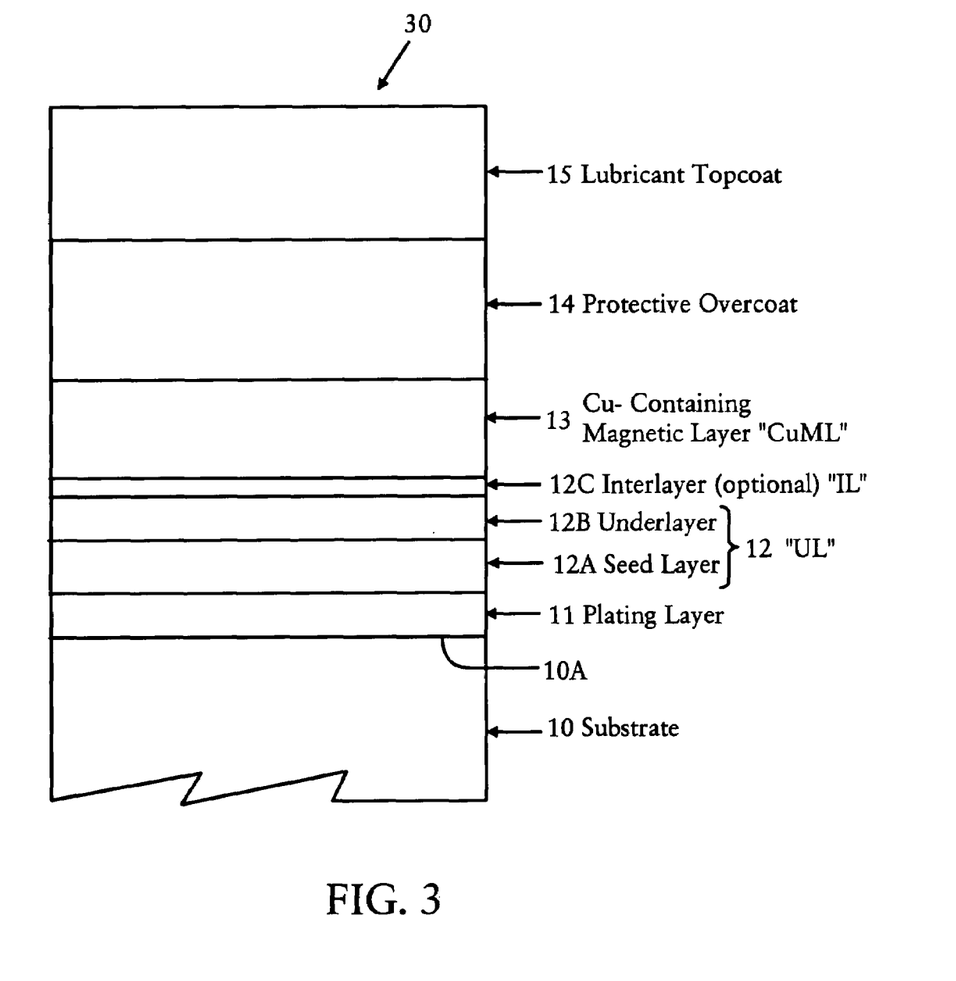
FIG. 3 schematically illustrates, in simplified cross-sectional view, a portion of a thin-film magnetic recording medium according to an embodiment of the present invention.

Referring now to FIG. 3, schematically illustrated therein, in simplified cross-sectional view, is a portion of a thin-film magnetic recording medium 30 according to an embodiment of the present invention. As illustrated, magnetic recording medium 30 includes a non-magnetic substrate 10 selected from among non-magnetic metals and alloys, Al, Al-based alloys such as Al—Mg alloys, NiP-plated Al ("Al/NiP"), glass, ceramics, polymers, and composites and laminates of the aforementioned materials. The thickness of substrate 10 is not critical; however, in the case of magnetic recording media for use in hard disk applications, substrate 10 must be of a thickness sufficient to provide the necessary rigidity. When medium 20 takes the form of a hard disk, substrate 10 typically comprises Al or an Al-based alloy, e.g., an Al—Mg alloy, and includes on the surface 10A thereof a plating layer 11, e.g., a layer of amorphous NiP. Formed on the plating layer 11 is an underlayer ("UL") 12, including a seed layer 12A and a polycrystalline underlayer 12B, for controlling the crystallographic texture and properties of ferromagnetic Co-based alloy layers deposited thereover. Seed layer 12A is comprised of an amorphous or fine-grained material, e.g., a Ni—Al, Fe—Al, Cr—Ti, Cr—Ta, Ta, Ta—W, Ru—Al, TaN, or CoW layer from about 0.5 to about 50 nm thick, preferably about 10 to about 25 nm thick. The overlying non-magnetic, polycrystalline underlayer 12B is typically a Cr or Cr-based alloy layer (e.g., of Cr, CrX, CrXY, or CrXYZ, where X, Y, Z each=B, Ti, V, Zr, Nb, Mo, Ru, Hf, W, and Ta), or a Cr/CrX, Cr/CrXY, or Cr/CrXYZ bi-layer structure, where X, Y, Z each=B, Ti, V, Zr, Nb, Mo, Ru, Hf, W, and Ta. Underlayer 12B generally is from about 3 to about 15 nm thick, preferably from about 6 to about 10 nm thick.

Overlying and in contact with underlayer 12B is an optional non-magnetic interlayer ("IL") 12C, comprising an up to about. 8 nm thick, preferably from about 2 to about 5 nm thick, layer of a CoCrXYZ alloy, where X, Y, and Z each=B, Ti, V, Cu, Zr, Nb, Mo, Ru, Ag, Hf, W, Ta, Au, and Pt.

According to the embodiment of the invention illustrated in FIG. 3, at least one Cu-containing magnetic recording layer (CuML) 13 is in overlying contact with underlayer 12B or optional interlayer 12C is from about 0.5 to about 30 nm thick, preferably from about 2 to about 15 nm thick, and comprised of one of the aforementioned novel magnetic alloy materials (a), (b), and (c), each of which may be present in a "Cr-rich" or "Cr-poor" state, as defined supra, and may contain at least one added element, also as enumerated above.

Completing the layer stack constituting medium 30 is a protective overcoat layer 14 in overlying contact with magnetic recording layer 13, which protective overcoat layer typically comprises carbon (C), e.g., in the form of a diamond-like carbon ("DLC"), and a lubricant topcoat layer 15 in overlying contact with the protective overcoat layer, e.g., a thin layer of a perfluoropolyether compound.

Each of the layers constituting magnetic recording medium 30, except for the lubricant topcoat layer 15, may be deposited or otherwise formed by any suitable physical vapor deposition technique (PVD), e.g., sputtering, or by a combination of PVD techniques, i.e., sputtering, vacuum evaporation, etc., with sputtering being preferred. Lubricant topcoat layer 15 is typically provided over the upper surface of the protective overcoat layer 14 in conventional fashion, e.g., as by dipping of the medium into a bath containing a solution of the lubricant compound, followed by removal of excess liquid, as by wiping.

According to embodiments of the present invention, the magnetic recording layer 13 is comprised of: (1) at least one Cu-containing magnetic recording layer (CuML) comprised of a Cu-containing magnetic alloy material having a composition represented by the formula $Co_{100-x-y-z-\alpha}Cr_xPt_yB_zCu_\alpha$, wherein $0<x\leq 30$, $0<y\leq 30$, $0<z\leq 24$, $0<\alpha\leq 10$, and $x+z\leq 35$; and (2) at least one Cu-containing magnetic layer (CuML), selected from materials (a), (b), and (c) described supra. Each layer (1) and (2) is from about 0.5 to about 30 nm thick, preferably from about 2 to about 15 nm thick.

According to other embodiments of the present invention, the magnetic recording layer 13 is comprised of: (1) at least one Cu-free magnetic layer (ML), e.g., of a magnetic alloy material selected from among CoCr and CoCr containing at least one element selected from the group consisting of B, Si, Ti, V, Fe, Ni, Ge, Zr, Nb, Mo, Ru, Ag, Hf, W, Pt, and Au; and (2) at least one Cu-containing magnetic layer (CuML), selected from materials (a), (b), and (c) described supra.

Each layer (1) and (2) is from about 0.5 to about 30 nm thick, preferably from about 2 to about 15 nm thick.

Figure 4:
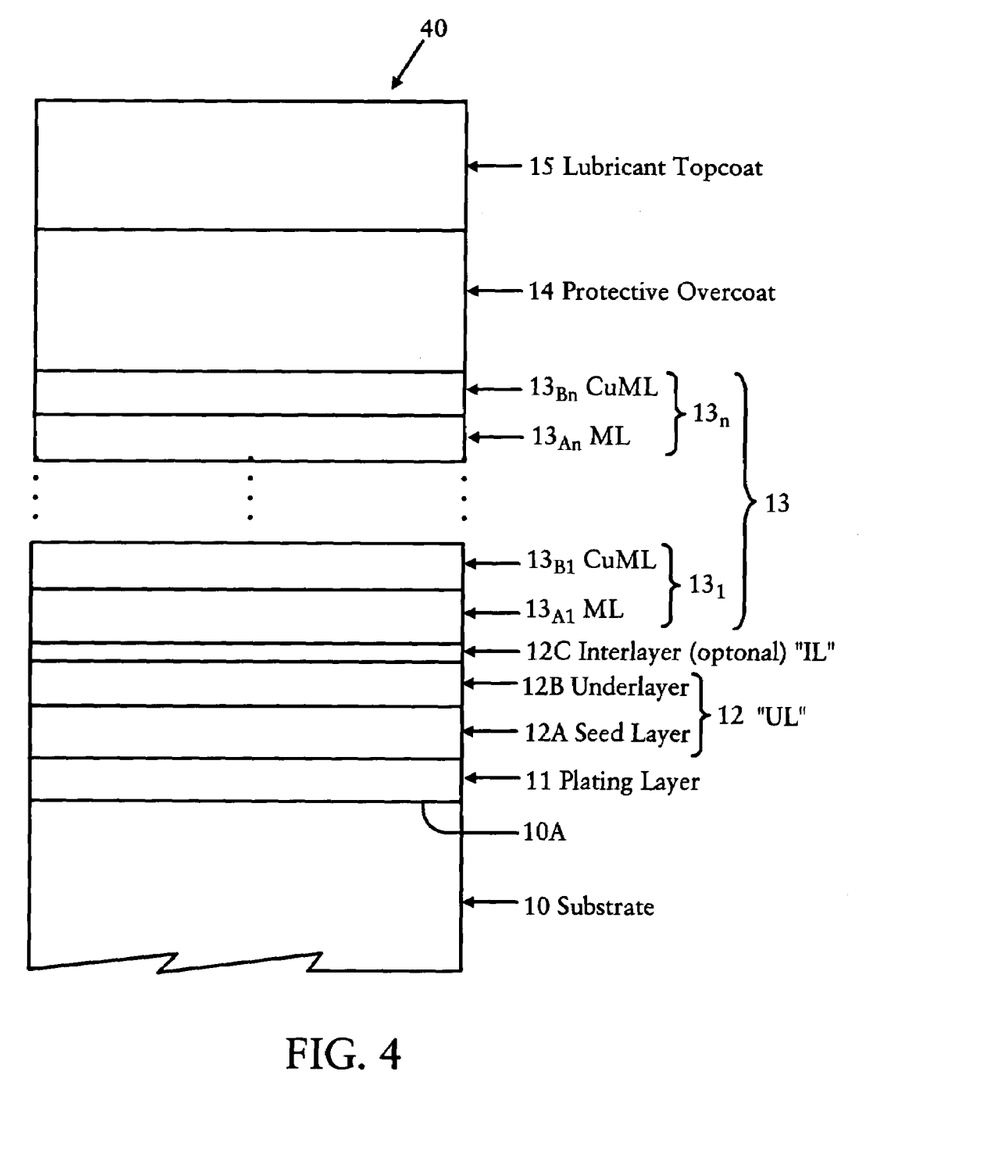
FIGS. 4-8 schematically illustrate, in simplified cross-sectional views, portions of thin-film magnetic recording media according to stacked multi-layer embodiments of the present invention.

Adverting to FIG. 4, schematically illustrated therein, in simplified cross-sectional view, is a portion of an embodiment of a thin-film magnetic recording medium 40 according to the present invention, wherein the magnetic recording layer 13 includes a stacked bi-layer structure [ML/CuML]$_n$, where n=1 to 10 and each [ML/CuML] bi-layer is comprised of a Cu-free magnetic recording layer (ML) 13A$_n$ and an overlying Cu-containing magnetic recording layer (CuML) 13B$_n$ (selected from materials (a), (b), and (c) described supra), each Cu-free magnetic recording layer (ML) 13A$_n$ being from about 0.5 to about 30 nm thick, preferably from about 2 to about 15 nm thick, and each overlying Cu-containing magnetic recording layer (CuML) 13B$_n$ being from about 0.5 to about 30 nm thick, preferably from about 2 to about 15 nm thick.

Figure 5:
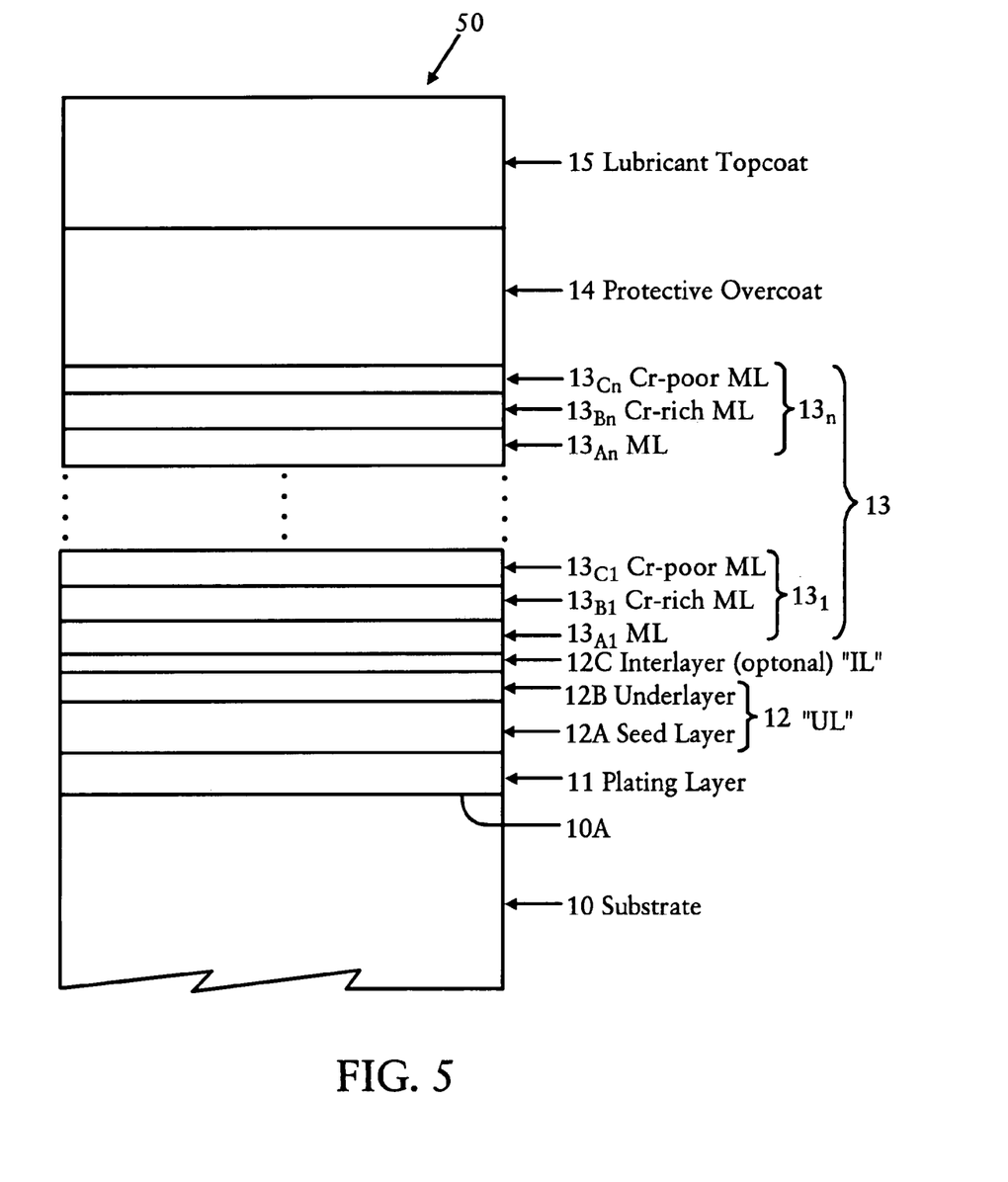

FIG. 5 schematically illustrates, in simplified cross-sectional view, a portion of another embodiment of a thin-film magnetic recording medium 50 according to the present invention, wherein the magnetic recording layer 13 includes a stacked tri-layer structure [ML/Cr-rich CuML/Cr-poor CuML]$_n$, where n=1 to 10 and each tri-layer [ML/Cr-rich CuML/Cr-poor CuML] is comprised, in overlying sequence, of a Cu-free magnetic recording layer (ML) 13$_{An}$, a Cu-containing magnetic recording layer (Cr-rich CuML) 13$_{Bn}$ of a Cr-rich magnetic material (a), (b), or (c) as described supra, and a Cu-containing magnetic recording layer (Cu-poor CuML) 13$_{Cn}$ of a Cr-poor material (a), (b), or (c) as described supra, each Cu-free magnetic recording layer (ML) 13A$_n$ being from about 0.5 to about 30 nm thick, preferably from about 2 to about 15 nm thick, each Cr-rich, Cu-containing magnetic recording layer (Cr-rich ML) 13B$_n$ being from about 0.5 to about 30 nm thick, preferably from about 2 to about 20 nm thick, and each Cr-poor, Cu-containing magnetic recording layer (Cr-poor ML) 13C$_n$ being from about 0.5 to about 30 nm thick, preferably from about 2 to about 15 mm thick.

Figure 6:
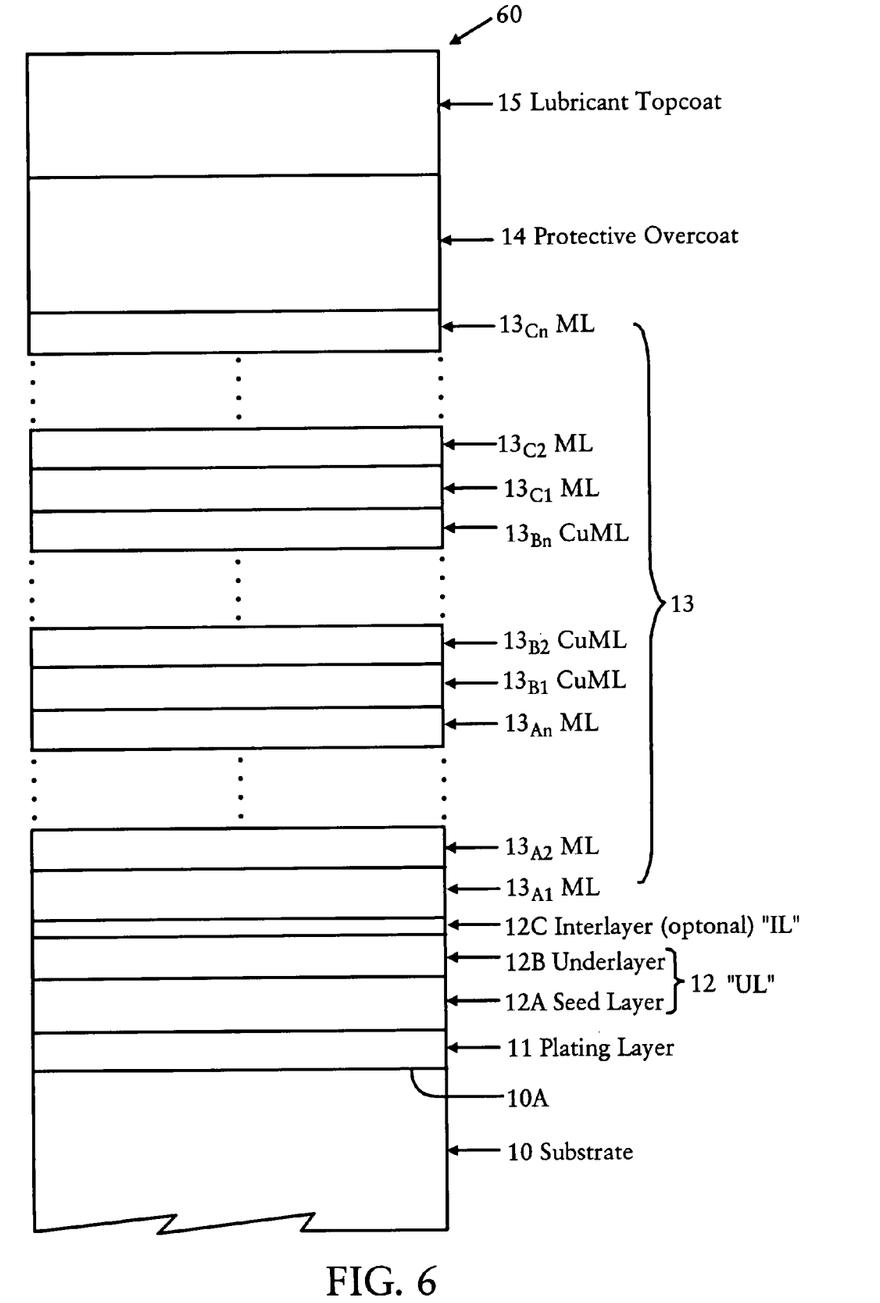

Referring to FIG. 6, schematically shown therein, in simplified cross-sectional view, is a portion of still another embodiment of a thin-film magnetic recording medium 60 according to the present invention, wherein the magnetic recording layer 13 comprises a stacked layer structure [ML]$_{i1}$[CuML]$_j$[ML]$_{i2}$, where i$_1$ and i$_2$ each=0-10, j=1-10, and i$_1$+i$_2$+j≧2, comprised, in overlying sequence, of 0-10 stacked Cu-free magnetic recording layers 13$_{A1}$ . . . 13$_{An}$ (ML)$_{i1}$, 1-10 stacked Cu-containing magnetic recording layers (CuML) 13$_{B1}$ . . . 13$_{Bn}$, each comprised of a Cr-rich or Cr-poor Cu-containing magnetic alloy material (a), (b), or (c) as described supra, and 0-10 stacked Cu-free magnetic recording layers 13$_{C1}$ . . . 13$_{Cn}$ (ML)$_{i2}$. Each Cu-free magnetic recording layer (ML)$_{i1}$ 13$_A$ is from about 0.5 to about 30 nm thick, preferably from about 2 to about 15 nm thick; each Cu-containing magnetic recording layer (CuML) 13$_B$ is from about 0.5 to about 30 nm thick, preferably from about 2 to about 15-20 nm thick; and each Cu-free magnetic recording layer (ML)$_{i2}$ 13$_C$ is from about 0.5 to about 30 nm thick, preferably from about 2 to about 15 nm thick.

Figure 7:
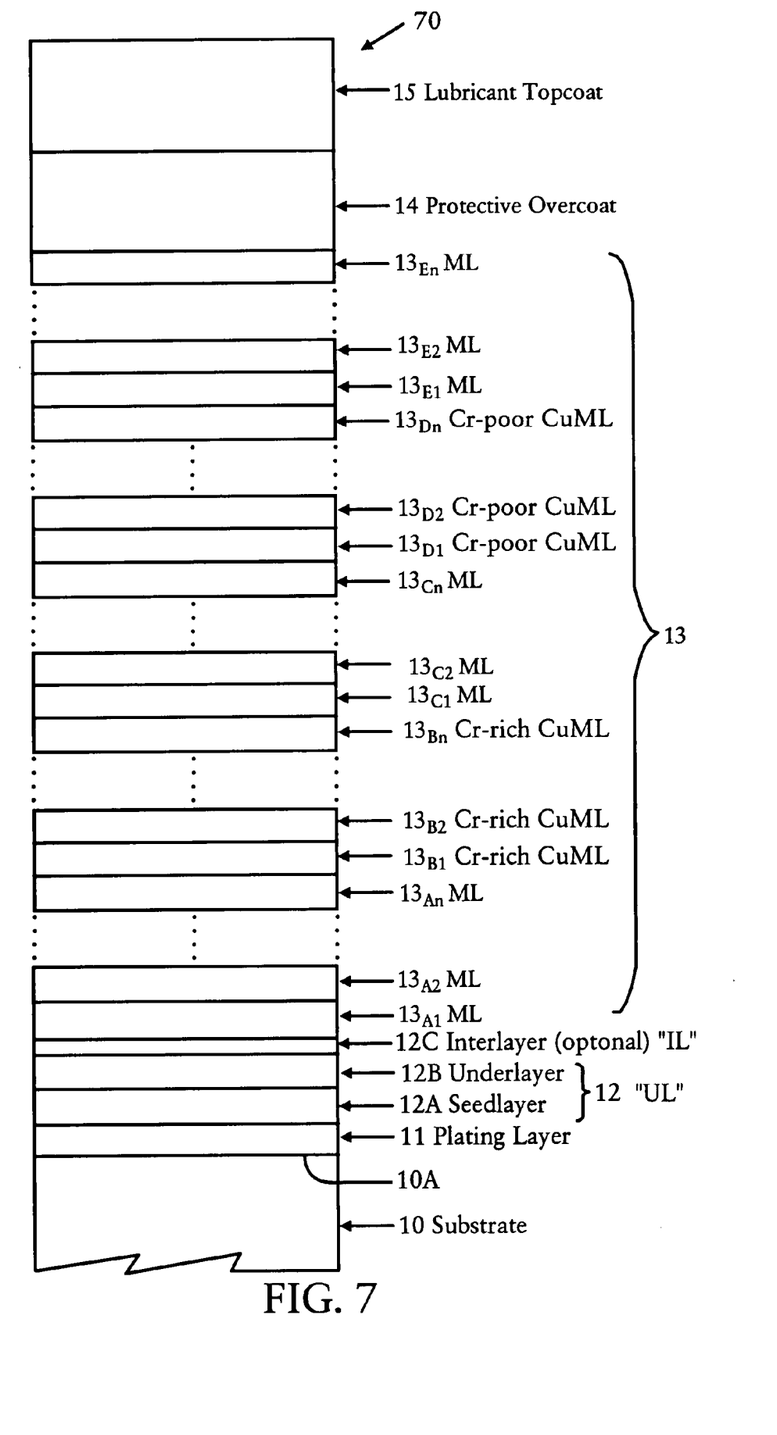

Adverting to FIG. 7, schematically shown therein, in simplified cross-sectional view, is a portion of yet another embodiment of a thin-film magnetic recording medium 70 according to the present invention, wherein the magnetic recording layer 13 includes a stacked layer structure [ML]$_{i1}$[Cr-rich CuML]$_j$[Ml]$_{i2}$[Cr-poor CuML]k[ML]$_{i3}$, where i$_1$, i$_2$, and i$_3$ each=0-10, j and k each=1-10, and i$_1$+i$_2$+i$_3$+j+k≧3, comprised, in overlying sequence, of 0-10 stacked Cu-free magnetic layers 13$_{A1}$ . . . 13$_{An}$ (ML)$_{i1}$; 1-10 stacked Cr-rich, Cu-containing magnetic layers 13$_{B1}$ . . . 13$_{Bn}$ (Cr-rich CuML)$_j$, each comprised of a Cr-rich, Cu-containing magnetic alloy material (a), (b), or (c); 0-10 stacked Cu-free magnetic layers 13$_{C1}$ . . . 13$_{Cn}$ (ML)$_{i2}$; 1-10 stacked Cr-poor, Cu-containing magnetic layers 13$_{D1}$ . . . 13$_{Dn}$ (Cr-poor CuML)$_k$ each comprised of a Cr-poor, Cu-containing magnetic alloy material (a), (b), or (c); and 0-10 stacked Cu-free magnetic layers 13$_{E1}$ . . . 13$_{En}$ (ML)$_{i3}$. Each Cu-free magnetic recording layer (ML)$_{i1}$ 13$_A$, (ML)$_{i2}$ 13$_C$, and (ML)$_{i3}$ 13$_E$ is from about 0.5 to about 30 nm thick, preferably from about 2 to about 15 nm thick; each Cr-rich, Cu-containing magnetic recording layer (Cr-rich CuML)$_j$ 13$_B$ is from about 0.5 to about 30 nm thick, preferably from about 2 to about 15 nm thick; and each Cr-poor, Cu-containing magnetic recording layer (Cr-poor CuML)$_k$ 13$_D$ is from about 0.5 to about 30 nm thick, preferably from about 2 to about 20 nm thick.

Figure 8:
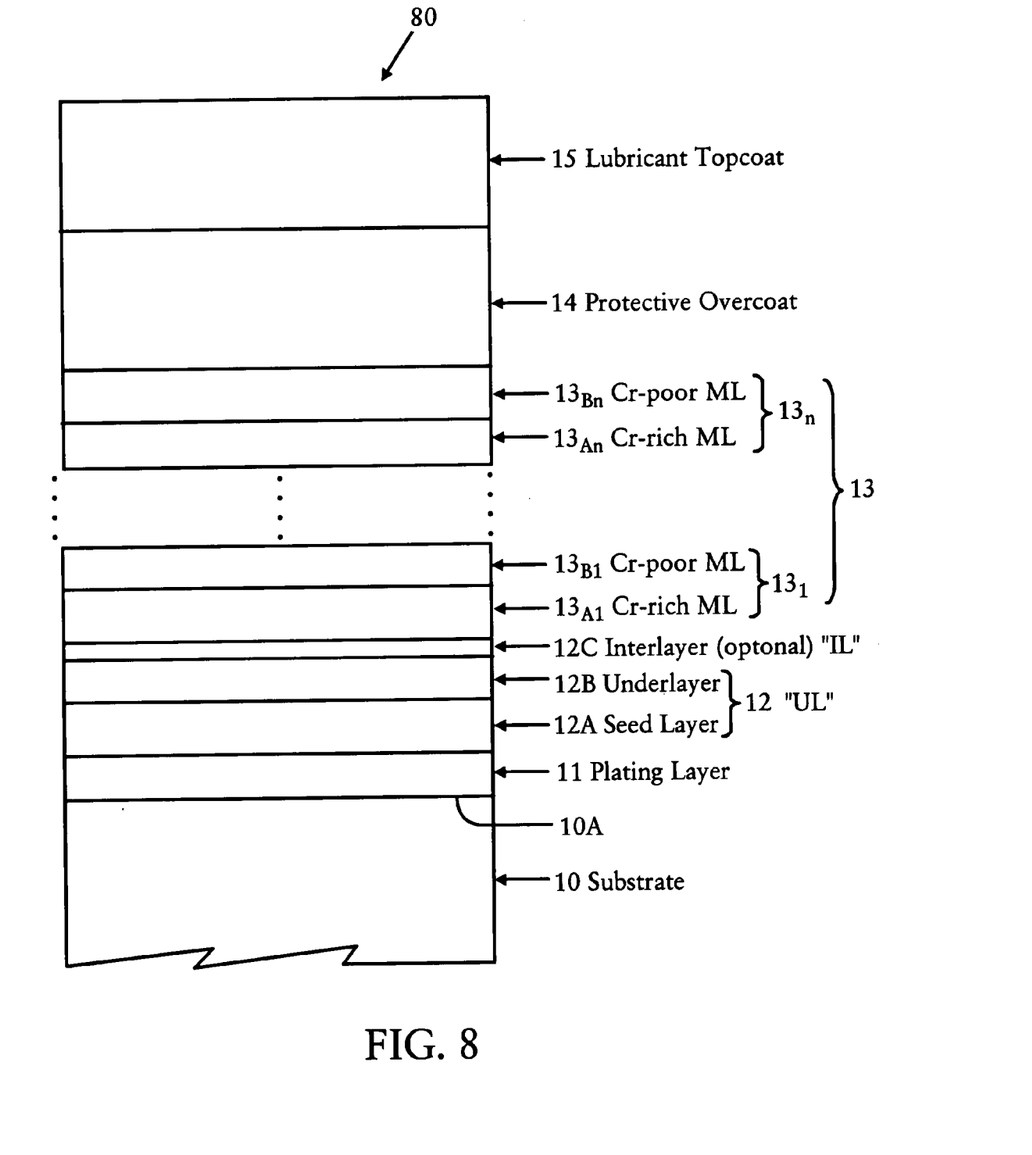

FIG. 8 schematically illustrates, in simplified cross-sectional view, a portion of a further embodiment of a thin-film magnetic recording medium 80 according to the present invention, wherein the magnetic recording layer 13 includes a stacked bi-layer structure [Cu-rich CuML/Cr-poor CuML]$_n$, where n=1 to 10 and each [Cr-rich CuML/Cr-poor CuML] bi-layer is comprised of a Cu-containing, Cr-rich magnetic recording layer (Cr-rich CuML) 13$_A$ of a Cr-rich magnetic material (a), (b), or (c) as described supra, and an overlying Cu-containing, Cr-poor magnetic recording layer (Cr-poor CuML) 13$_B$ of a Cr-poor material (a), (b), or (c), also as described supra. Each Cr-rich magnetic recording layer (Cu-rich CuML) 13$_A$ is from about 0.5 to about 30 nm thick, preferably from about 2 to about 15 nm thick and each Cr-poor magnetic recording layer (Cr-poor CuML) 13$_B$ is from about 0.5 to about 30 nm thick, preferably from about 2 to about 20 nm thick.

Figure 9:
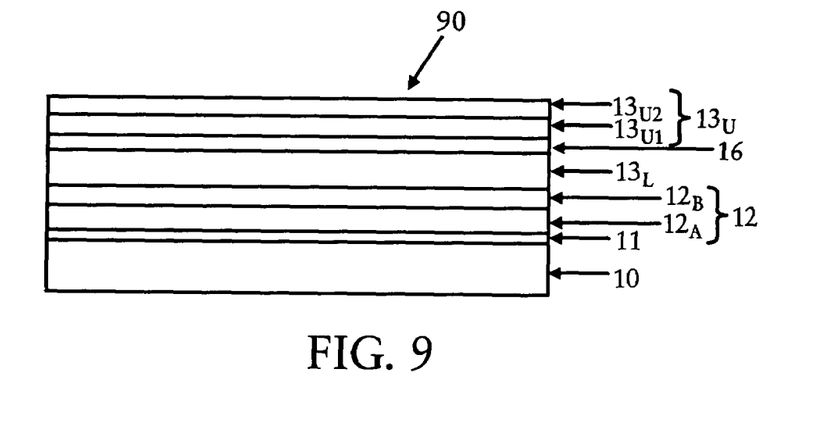
FIG. 9 schematically illustrates, in simplified cross-sectional view, a portion of an anti-ferromagnetically coupled (AFC) medium according to an embodiment of the invention.

Referring now to FIG. 9, schematically illustrated therein, in simplified cross-sectional view, is a portion of an antiferromagnetically coupled (AFC) medium 90 according to an embodiment of the invention, having a layer structure similar to that shown in FIG. 2, (i.e., including a bottom (or lower) magnetic layer (BL) 13$_L$ and a top (or upper) magnetic layer (TL) 13$_U$ spaced apart by a thin, non-magnetic spacer layer (SL) 16, but wherein the top (or upper) ferromagnetic layer (TL) 13$_U$ includes at least one stacked pair of magnetic layers comprised of a first (or lower) layer 13$_{U1}$ (ML) comprised of a Cu-free magnetic alloy material and a top (or upper) layer (CuML) 13$_{U2}$ comprised of a Cu-containing magnetic alloy material (a), (b), or (c), as described supra. Layer 13$_{U1}$ is from about 0.5 to about 30 nm thick, preferably from about 2 to about 15 nm thick and layer 13$_{U2}$ is from about 0.5 to about 30 nm thick, preferably from about 2 to about 15 nm thick. As before, the top and bottom magnetic layers 13$_U$ and 13$_L$ are spaced apart by a thin, non-magnetic spacer layer (SL) 16 comprised of a non-magnetic material selected from the group consisting of: Ru, Rh, Ir, Cr, Cu, Re, V, and their alloys.

Additional embodiments of AFC media according to the invention include those wherein a Cu-free magnetic layer (ML), termed a "top interface layer" (TIL), is interposed between the top magnetic recording layer $^{13}$u and the spacer layer (SL) 16 for improving RKKY coupling between the top and bottom magnetic layers 13$_U$ and 13$_L$.

The advantages afforded by the present invention will now be demonstrated by reference to the following examples. Addition of Cu to magnetic alloys, e.g., CoCr alloys, was investigated in pursuit of improved segregation within CoCr-based magnetic layers in view of its inherently low miscibility with Co at temperatures below 573° K. AFC media with the following structure: Substrate/UL/BL/SL/TIL/UL, where UL=ML/CuML, ML=CoCrPtB, and CuML=CoCrPtBCu were fabricated by sputtering. In the following Table I, Structures No. 1-3 respectively refer to CuML=ML, i.e., $Co_{59}Cr_{15}Pt_4B_{12}$ (i.e., no Cu); CuML=$Co_{57}Cr_{13}Pt_{14}B_{14}Cu_2$; and CuML=$Co_{57}Cr_{13}Pt_{14}B_{12}Cu_4$. The thickness of each of the $Co_{59}Cr_{15}Pt_{14}B_{12}$, $Co_{57}Cr_{13}Pt_{14}B_{14}Cu_2$, and $Co_{57}Cr_{13}Pt_{14}B_{12}Cu_4$ layers was ~7 nm.

TABLE I

| No. | $H_c$ (Oe) | $M_rT$ (memu/cm$^2$) | S* | MFA (mV) | LFA (mV) | Res. (%) | $PW_{50}$ (μinch) | OW (-dB) | ΔmSNR (dB) | $W_r$Width (μinch) |
|---|---|---|---|---|---|---|---|---|---|---|
| 1 | 4657 | 0.33 | 0.86 | 1.15 | 1.26 | 91.5 | 2.87 | 33.5 | 0.0 | 8.1 |
| 2 | 4776 | 0.33 | 0.78 | 1.11 | 1.22 | 91.5 | 2.90 | 34.2 | 0.6 | 8.0 |
| 3 | 4874 | 0.33 | 0.83 | 1.11 | 1.20 | 92.3 | 2.91 | 31.3 | 0.8 | 7.8 |

The results shown in Table I indicate that the addition of Cu to the CoCrPtB magnetic alloy recording (top) layer of the AFC media in amounts up to ~4 at. % improves SNR and mSNR by up to ~0.6 dB and the thermal stability of the media is improved to ~0.3%/decade.

Figure 10:
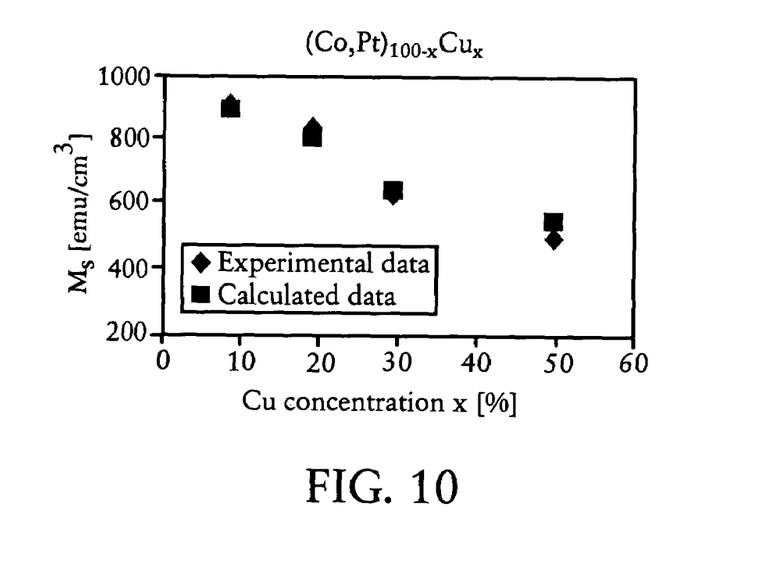
FIG. 10 is a graph for illustrating the variation of the saturation magnetization, $M_s$, of $(Co,Pt)_{100-x}Cu_x$ alloy layers as a function of the Cu content x in $Cr/CoCr/(Co,Pt)_{100-x}Cu_x$ film structures.

The variation of the saturation magnetization, $M_s$, of $(Co,Pt)_{100-x}Cu_x$ alloy layers as a function of the Cu content x in Cr/CoCr/$(Co,Pt)_{100-x}Cu_x$ film structures was also investigated, wherein each of the layers was formed at ~530 °K. to establish a Cr[200]/CoCr [11-20]/$(Co,Pt)_{100-x}Cu_x$ [11-20] texture. As is evident from the graph of FIG. 10, the $M_s$ of the $(Co,Pt)_{100-x}Cu_x$ alloys measured by VSM in magnetic fields up to 22 kOe is the same as the $M_s$ of $(Co,Pt)_{100-x}Cu_x$ calculated by assuming that Cu is insoluble in CoPt. This result demonstrates that addition of Cu to CoCrPtB films (to form CoCrPtBCu) may avoid formation of CoPt-rich grains and therefore may be important for establishing sharper transitions between magnetic grains and non-magnetic grain boundaries.

Thus, it has been demonstrated that CoCr-based magnetic media with superior recording properties can be obtained by addition of Cu to, e.g., CoCrPtB ferromagnetic films, for creating sharper transitions between Co-containing magnetic grains and Cr-segregated non-magnetic grain boundaries. The present invention thus advantageously provides high quality, high areal recording density magnetic recording media exhibiting increased saturation magnetization Ms, magnetocrystalline anisotropy, and narrower intrinsic switching field distribution, as well as enhanced SNR, mSNR, and thermal stability. Moreover, the inventive methodology can be practiced in a cost-effective manner, utilizing conventional manufacturing technology and equipment (e.g., sputtering technology and equipment) for automated, large-scale manufacture of magnetic recording media, such as hard disks. Finally, the invention is not limited to use with hard disks, but rather is broadly applicable to the formation of thermally stable, high areal density magnetic recording media suitable for use in all manner of devices, products, and applications.

In the previous description, numerous specific details are set forth, such as specific materials, structures, processes, etc., in order to provide a better understanding of the present invention. However, the present invention can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A magnetic recording medium including Cu-containing magnetic recording layers (CuML) comprised of a stacked bi-layer structure [Cr-rich CuML/Cr-poor CuML]$_n$, where n=1 to 10 and said [Cr-rich CuML/Cr-poor CuML] bi-layer is comprised of a Cr-rich, Cu-containing magnetic recording layer (Cr-rich CuML) that includes a Cr-rich magnetic alloy material selected from the group consisting of:

(a) a CoCrPtBCu alloy having a composition represented by the formula $Co_{100-x-y-z-\alpha}Cr_xPt_yB_zCu_\alpha$, wherein $16 \leq x \leq 20$, $0<y \leq 30$, $0<z \leq 24$, and $0<\alpha \leq 10$;

(b) a CoCrPtBCu alloy having a composition represented by the formula $Co_{100-x-y-z-\alpha}Cr_xPt_yB_zCu_\alpha$, wherein $16 \leq x \leq 30$, $0<y \leq 30$, $7<z \leq 24$, and $0<\alpha \leq 10$; and (c) a CoCrTaCu alloy having a composition represented by the formula $Co_{100-x-y-\alpha}Cr_xTa_yCu_\alpha$, wherein $16 \leq x < 30$, containing up to 8 at. % Ta, and up to 10 at. % Cu; and a Cr-poor, Cu-containing magnetic recording layer (Cr-poor CuML) that includes a Cr-poor magnetic alloy material selected from the group consisting of:

(d) a CoCrPtBCu alloy having a composition represented by the formula $Co_{100-x-y-z-\alpha}Cr_xPt_yB_zCu_\alpha$, wherein $0<x<16$, $0<y \leq 30$, $0<z \leq 24$, and $0<\alpha \leq 10$;

(e) a CoCrPtBCu alloy having a composition represented by the formula $Co_{100-x-y-z-\alpha}Cr_xPt_yB_zCu_\alpha$, wherein $0<x<16$, $0<y \leq 30$, $7<z \leq 24$, and $0<\alpha \leq 10$; and (f) a CoCrTaCu alloy having a composition represented by the formula $Co_{100-x-y-\alpha}Cr_xTa_yCu_\alpha$, wherein $0<x<16$, containing up to 8 at. % Ta, and up to 10 at. % Cu.

2. The medium as in claim 1, wherein:

said Cr-rich CuML and Cr-poor CuML layers are selected from the group consisting of (a) and (b), and (d) and (e), respectively, and said Cu-containing magnetic alloy materials (a), (b), (d), and (e) further include at least one element selected from the group consisting of: Si, Ti, V, Fe, Ni, Ge, Zr, Nb, Mo, Ru, Ag, Hf, Ta, W, and Au.

3. The medium as in claim 1, wherein:

said Cr-rich CuML and Cr-poor CuML layers are selected from the group consisting of (c) and (f), respectively, and said Cu-containing magnetic alloy material (c) and (f) further include at least one element selected from the group consisting of: B, Si, Ti, V, Fe, Ni, Ge, Zr, Nb, Mo, Ru, Ag, Hf, Pt, W, and Au.

4. The medium as in claim 1, further including at least one additional Cu-containing magnetic recording layer (CuML) comprised of a Cu-containing magnetic alloy material having a composition represented by the formula $Co_{100-x-y-z-\alpha}Cr_xPt_yB_zCu_\alpha$, wherein $0<x\leq30$, $0<y\leq30$, $0<z\leq24$, $0<\alpha\leq10$, and $x+z\leq35$.

5. The medium as in claim 1, further including at least one Cu-free magnetic recording layer (ML).

6. The medium as in claim 5, wherein said at least one Cu-free magnetic recording layer (ML) comprises a magnetic alloy material selected from among CoCr and CoCr containing at least one element selected from the group consisting of B, Si, Ti, V, Fe, Ni, Ge, Zr, Nb, Mo, Ru, Ag, Hf, W, Pt, and Au.

7. A magnetic recording medium including Cu-containing magnetic recording layers (CuML) and at least one Cu-free magnetic recording (ML) comprised of a stacked tri-layer structure [ML/Cr-rich CuML/Cr-poor CuML]$_n$, where n=1 to 10 and each [ML/Cr-rich CuML/Cr-poor CuML] tri-layer is comprised of a Cu-free magnetic recording layer (ML); a Cr-rich, Cu-containing magnetic recording layer (Cr-rich CuML) comprised of a Cu-containing magnetic alloy material selected from the group consisting of:

a CoCrPtBCu alloy having a composition represented by the formula $Co_{100-x-y-z-\alpha}Cr_xPt_yB_zCu_\alpha$, wherein $16\leq x\leq20$, $0<y\leq30$, $0<z\leq24$, and $0<\alpha\leq10$;

a CoCrPtBCu alloy having a composition represented by the formula $Co_{100-x-y-z-\alpha}Cr_xPt_yB_zCu_\alpha$, wherein $16\leq x\leq30$, $0<y\leq30$, $7<z\leq24$, and $0<\alpha\leq10$; and a CoCrTaCu alloy having a composition represented by the formula $Co_{100-x-y-\alpha}Cr_xTa_yCu_\alpha$, wherein $16\leq x\leq30$, containing up to 8 at. % Ta, and up to 10 at. % Cu; and a Cr-poor, Cu-containing magnetic recording layer (Cr-poor CuML) comprised of a Cu-containing magnetic alloy material selected from the group consisting of:

a CoCrPtBCu alloy having a composition represented by the formula $Co_{100-x-y-z-\alpha}Cr_xPt_yB_zCu_\alpha$, wherein $0<x<16$, $0<y\leq30$, $0<z\leq24$, and $0<\alpha\leq10$;

a CoCrPtBCu alloy having a composition represented by the formula $Co_{100-x-y-z-\alpha}Cr_xPt_yB_zCu_\alpha$, wherein $0<x<16$, $0<y\leq30$, $7<z\leq24$, and $0<\alpha\leq10$; and (c) a CoCrTaCu alloy having a composition represented by the formula $Co_{100-x-y-\alpha}Cr_xTa_yCu_\alpha$, wherein $0<x<16$, containing up to 8 at. % Ta, and up to 10 at. % Cu.

8. The medium as in claim 1, in the form of an anti-ferromagnetically coupled (AFC) medium, comprising:

a bottom magnetic layer spaced apart from a top magnetic recording layer by a non-magnetic spacer layer.

9. The medium as in claim 8, wherein:

said spacer layer comprises a non-magnetic material selected from the group consisting of: Ru, Rh, Ir, Cr, Cu, Re, V, and their alloys.

10. The medium as in claim 8, wherein:

said top magnetic recording layer further includes at least one Cu-free magnetic recording layer (ML).

11. The medium as in claim 8, further comprising:

a top interface layer between said top magnetic recording layer and said spacer layer for improving RKKY coupling of said top and bottom magnetic layers.

12. The medium as in claim 1, comprising:

a non-magnetic substrate and non-magnetic seed and underlayers.

13. The medium as in claim 12, further comprising:

at least one non-magnetic interlayer between the Cr-rich CuML and the Cr-poor CuML layers.

* * * * *